United States Patent [19]

Abel et al.

[11] Patent Number: 4,559,162
[45] Date of Patent: Dec. 17, 1985

[54] COMPOSITIONS OF POLYMERS BASED ON ACRYLIC ACID, SOLVENTS, SURFACTANTS AND, IF APPROPRIATE, SILICONE OILS, THEIR PREPARATION AND THEIR USE AS ANTI-FOAMS AND DEAERATING AGENTS

[75] Inventors: Heinz Abel, Reinach; Rosemarie Töpfl, Dornach, both of Switzerland

[73] Assignee: Ciba-Geigy Corporation, Ardsley, N.Y.

[21] Appl. No.: 353,309

[22] Filed: Mar. 1, 1982

[30] Foreign Application Priority Data

Mar. 10, 1981 [CH]  Switzerland ......................... 1624/81

[51] Int. Cl.$^4$ ......................... B01D 19/04; C09K 3/00
[52] U.S. Cl. ........................................ 252/321; 8/558; 8/581; 252/314; 252/358
[58] Field of Search ........................ 252/321, 358, 314; 524/385, 484; 430/904

[56] References Cited

U.S. PATENT DOCUMENTS

| | | | |
|---|---|---|---|
| 2,834,748 | 5/1958 | Bailey et al. | 525/477 |
| 3,389,160 | 6/1968 | Reid | 260/448.2 |
| 3,505,377 | 4/1970 | Morehouse | 260/448.2 |
| 3,507,815 | 4/1970 | Bailey et al. | 252/182 X |
| 3,629,308 | 12/1971 | Bailey et al. | 260/448.2 |
| 3,697,440 | 10/1972 | Lichtman et al. | 252/321 |
| 3,746,653 | 7/1973 | Churchfield | 252/321 |
| 3,784,391 | 1/1974 | Kruse et al. | 106/170 |
| 3,793,223 | 2/1974 | Lichtman et al. | 252/358 |
| 3,912,652 | 10/1975 | Colquhoun | 252/358 |
| 3,993,483 | 11/1976 | Maki et al. | 430/904 X |
| 4,021,365 | 5/1977 | Sinka et al. | 252/321 |
| 4,071,468 | 1/1978 | Abel et al. | 252/321 |
| 4,092,266 | 5/1978 | Abel et al. | 252/321 |
| 4,225,456 | 9/1980 | Schmidt et al. | 252/321 |
| 4,230,599 | 10/1980 | Elfers | 252/321 |
| 4,341,656 | 7/1982 | Abel | 252/321 |
| 4,343,728 | 8/1982 | Eschwey et al. | 524/385 X |

FOREIGN PATENT DOCUMENTS

| | | |
|---|---|---|
| 2141905 | 3/1973 | Fed. Rep. of Germany ...... 252/358 |
| 711375 | 6/1954 | United Kingdom . |
| 849066 | 9/1960 | United Kingdom . |
| 882113 | 11/1961 | United Kingdom . |
| 942947 | 11/1963 | United Kingdom . |
| 1029318 | 5/1966 | United Kingdom . |
| 1224026 | 3/1971 | United Kingdom ................ 252/321 |
| 1378907 | 12/1974 | United Kingdom . |
| 1461840 | 1/1977 | United Kingdom . |
| 1539131 | 1/1979 | United Kingdom . |

OTHER PUBLICATIONS

Emulsions, Latices and Dispersions, S. Ross, et al pp. 237–256.

Primary Examiner—Richard D. Lovering
Attorney, Agent, or Firm—Edward McC. Roberts; Kevin T. Mansfield

[57] ABSTRACT

Surfactant-containing compositions of
(a) homopolymers of alkyl acrylates or methacrylates or copolymers of these alkyl esters with styrene or acrylic or methyacyrlic acid and
(b) hydronaphthalenes, alkylbenzenes, alkanols, alkylene oxide adducts of polyhydric alcohols or maleates of aliphatic alcohols can be used as anti-foams and deaerating agents for aqeuous systems.

As the surfactants, the compositions contain at least
(d) an anionic surfactant and/or
(e) a non-ionic surfactant.

In addition to components (a) and (b), the surfactant-containing compositions can contain
(c) hydrophobic silicone oils,
(f) hydrophilic siloxanoxyalkylene copolymers and/or
(g) hydrocarbon mixtures of paraffins and, if appropriate, naphthenes and aromatics.

23 Claims, No Drawings

COMPOSITIONS OF POLYMERS BASED ON ACRYLIC ACID, SOLVENTS, SURFACTANTS AND, IF APPROPRIATE, SILICONE OILS, THEIR PREPARATION AND THEIR USE AS ANTI-FOAMS AND DEAERATING AGENTS

Aqueous compositions of water-insoluble solvents, silicone oils and surfactants, such as are described, for example, in U.S. Pat. No. 4,071,468, are suitable as foam depressants for the defoaming of aqueous systems. The foam-depressing action of such compositions in alkaline, aqueous systems is, however, only weak. It has now been found that an addition of polymers based on acrylic acid to the known surfactant-containing compositions, together with the selection of particularly suitable water-insoluble solvents with or without a silicone oil, gives novel compositions, the anti-foam effect and also the deaeration effect of which is unexpectedly increased not only in weakly acid to neutral aqueous systems, but especially also in strongly alkaline aqueous systems.

The invention therefore relates to a surfactant-containing composition, which comprises, in a novel combination, at least (a) a homopolymer of an aliphatic $C_1$–$C_8$-alkyl acrylate or methacrylate or a copolymer of this alkyl ester with styrene or acrylic or methacrylic acid,
(b) a hydronaphthalene, an alkyl benzene, an acyclic or cyclic alkanol having 4 to 12 carbon atoms, an alkylene oxide adduct of a polyhydric alcohol having 2 to 6 carbon atoms or a maleate of aliphatic $C_4$–$C_{22}$-alcohols and, if appropriate, one or more of the components
(c) a hydrophobic silicone oil,
(f) a surface-active, hydrophilic siloxanoxyalkylene copolymer,
(g) a hydrocarbon mixture of paraffins and, if appropriate, naphthenes and aromatics and
(h) conventional additives.

The invention also relates to the process for the preparation of the composition according to the invention and to the use of the latter as an anti-foam and deaerating agent in aqueous systems, and also to the application processes for defoaming and deaerating aqueous systems, wherein the composition according to the invention is employed as an anti-foam and deaerating agent, and in particular to processes for the preparation of foam-free and air-free aqueous dyeing liquors or printing pastes thus prepared, to the corresponding dyeing or printing processes and to the textile material dyed or printed in this way, to processes for defoaming and deaerating industrial effluents, preferably in the activated sludge tank of effluent treatment plants, in cellulose manufacture for treating the effluent from the alkaline pulping of wood, and in the wash waters from industrial waste-air purification plants.

Compositions free from silicone oil contain, as the surfactants, at least one anionic or non-ionic surfactant or mixtures of an anionic or non-ionic surfactant, non-ionic surfactants by themselves being preferred. In addition to these above surfactants, the use of a surface-active siloxanoxyalkylene copolymer is the optional component (f) preferred. Additionally, the use of the hydrocarbon mixture as the component (g) is advantageous.

Thus, preferred compositions free from silicone oil contain (a) a homopolymer of an aliphatic $C_1$–$C_8$-alkyl acrylate or methacrylate or a copolymer of this alkyl ester with styrene or acrylic or methacrylic acid,
(b) a hydronaphthalene, an alkylbenzene, an acyclic or cyclic alkanol having 4 to 12 carbon atoms, an alkylene oxide adduct of a polyhydric alcohol having 2 to 6 carbon atoms or a maleate of aliphatic $C_4$–$C_{22}$-alcohols, at least one of the components
(d) an anionic surfactant or
(e) a non-ionic surfactant and, if appropriate, one or more of the components
(f) a surface-active, hydrophilic siloxyanoxyalkylene copolymer,
(g) a hydrocarbon mixture of paraffins and, if appropriate, naphthenes and aromatics and
(h) conventional additives, or in particular
(a) a homopolymer of an aliphatic $C_1$–$C_8$-alkyl acrylate or methacrylate or a copolymer of this alkyl ester with styrene or acrylic or methacrylic acid,
(b) a hydronaphthalene, an alkylbenzene, an acyclic or cyclic alkanol having 4 to 12 carbon atoms, an alkylene oxide adduct of a polyhydric alcohol having 2 to 6 carbon atoms or a maleate of aliphatic $C_4$–$C_{22}$-alcohols,
(e) a non-ionic surfactant,
(f) a surface-active, hydrophilic siloxanoxyalkylene copolymer,
(g) a hydrocarbon mixture of paraffins and, if appropriate, naphthenes and aromatics and, if appropriate,
(h) conventional additives.

In their preferred embodiment, the silicone-free compositions are storage-stable organic solutions in which no water is used for component (h) and component (e) is used as the dry substance.

The compositions containing a silicone oil as a rule contain inter alia water as component (h) and contain the surfactants (d) and (e) preferably as aqueous commercial formulations. The compositions containing silicone oil are thus in general aqueous and preferably represent storage-stable aqueous emulsions. The surfactants used as component (d) in compositions containing silicone oil are always anionic surfactants which, if appropriate, can be present as a mixture with non-ionic surfactants as component (e). As component (b) of compositions containing silicone oil, alkanols having at most 9 carbon atoms are preferred and, as component (g), hydrocarbon mixtures are preferred which, in addition to paraffins, contain naphthenes and aromatics. Accordingly, aqueous compositions are preferred which contain (a) a homopolymer of an aliphatic $C_1$–$C_8$-alkyl acrylate or methacrylate or a copolymer of this alkyl ester with styrene or acrylic or methacrylic acid,
(b) a hydronaphthalene, an alkylbenzene, an acyclic or cyclic alkanol having 4 to 12 carbon atoms, an alkylene oxide adduct of a polyhydric alcohol having 2 to 6 carbon atoms or a maleate of aliphatic $C_4$–$C_{22}$-alcohols,
(c) a hydrophobic silicone oil,
(d) an anionic surfactant and, if appropriate, one or more of the components
(e) a non-ionic surfactant,
(f) a surface-active, hydrophilic siloxanoxyalkylene copolymer,
(g) a hydrocarbon mixture of paraffins and, if appropriate, naphthenes and aromatics and
(h) conventional additives, or in particular (a) a homopolymer of an aliphatic $C_1$–$C_8$-alkyl acrylate or methacrylate or a copolymer of this alkyl ester with styrene or acrylic or methacrylic acid, (b) a hydronaphthalene, an alkylbenzene, an acylic or cyclic alkanol having 4 to 9 carbon atoms, an alkylene oxide adduct of a polyhydric alcohol having 2 to 6 carbon atoms, (c) a hydrophobic silicone oil, (d) an anionic surfactant and, if appropriate, one or more of the components (e) a non-ionic surfactant, (f) a surface-active, hydrophilic siloxanoxyalkylene copolymer and (g) a hydrocarbon mixture of paraffins.

A component (a) of the composition according to the invention can be either a copolymer or especially a homopolymer. Preferred monomers for these copolymers are ethyl, n-butyl or 2-ethyl-n-hexyl acrylates or methacrylates on the one hand and styrene, acrylic acid and methacrylic acid on the other hand, acrylates of the indicated type and acrylic acid being preferred to the methacrylates and methacrylic acid. The weight ratio of the acrylates or methacrylates of the indicated type to the styrene or acrylic acid or methacrylic acid is preferably between 2:1 and 20:1. Copolymers of ethyl acrylate and acrylic acid in a weight ratio of 19:1 and those of n-butyl acrylate and styrene in a weight ratio of 2:1/3:1 are particularly preferred. Homopolymers of ethyl, n-butyl and 2-ethyl-n-hexyl methacrylate or especially acrylate are, however, of prevailing interest. These copolymers and homopolymers known per se are prepared by methods which are likewise known per se, by polymerising the monomers or comonomers of the indicated type, as a rule in the presence of the components (g) or especially (b) described below as solvents, preferably in the presence of a polymerisation catalyst, such as azobisisobutyronitrile or in particular peroxides, such as benzoyl peroxide, generally at elevated temperatures from for example 50 to 100, in particular 70° to 90° C., and in an inert atmosphere, viz. using an inert gas, such as nitrogen. Preferably the quantities of components (g) and especially (b) employed in the preparation of component (a) are in general such that a 30 to 60, preferably 40 to 50, percent by weight solution of component (a) is obtained, the monomers or comonomers preferably being dissolved in component (g) or preferably (b) before the polymerisation and, if appropriate, the resultant solution of the homopolymer or copolymer being diluted further with component (g) or preferably (b) up to the stated content of component (a).

The preferred component (b) of the composition according to the invention can be a solvent in which component (a) is soluble and the optional component (c), described below, is either soluble or finely dispersable, as the case may be. Examples of preferred solvents of this type are dihydronaphthalene, tetrahydronaphthalene or decahydronaphthalene, a methyl-substituted or ethyl-substituted benzene, a cycloalkanol having 4 to 6 carbon atoms, an alkanol which has 6 to 12 carbon atoms and may be branched or cyano-substituted, and alkylene oxide adduct of glycerol or pentaerythritol and maleates of alkanols of the indicated type or of fatty alcohols having 8 to 18 carbon atoms.

Propylene oxide adducts of glycerol as the alkylene oxide adducts are particularly preferred representatives of component (b). Tetralin is the preferred representative of the hydronaphthalenes. Alkylene oxide adducts, in particular propylene oxide adducts, of glycerol are preferred to tetralin. However, methyl-substituted and ethyl-substituted benzene, especially methylethylbenzene, dimethylethylbenzene, trimethylethylbenzene, trimethylbenzene or tetramethylbenzene or mixtures thereof, especially mixtures of isomers of, in particular, trimethylbenzenes, are particularly preferred. Alkanols represent that class of component (b) which is of prevailing interest, specific representatives being cyclohexanol, i- or n-octanol, n-hexanol, trimethylhexanol which especially is in the form of a technical isomer mixture and may be cyanoethylated, and in particular 2-ethyl-n-hexanol. Especially, component (b) can also be a maleate of the alkanols mentioned, in particular of trimethylhexanol, or a diester of fatty alcohols, such as lauryl alcohol, stearyl alcohol or oleyl alcohol, and maleic acid, provided that the composition does not contain any component (c).

As already mentioned, component (b) is in general introduced during the preparation of component (a). Furthermore, component (b) can also be additionally added directly to the composition, and in particular whenever a maleate of the indicated type is used as component (b) or when preferentially high contents of component (b) of, for example, up to 40 percent by weight of the composition according to the invention must be reached. In the case of the preferred, additional direct addition of component (b) to the composition, the same solvent of the indicated type is as a rule used as component (b) as the solvent which was also used as component (b) in the preparation of component (a).

The hydrophobic silicone oil for component (c) is especially a commercial polyalkyl-, polyaryl- or polyaralkyl-siloxane oil or an alicyclic polysiloxane oil, for example those which are described in German Auslegeschrift No. 2,031,827 and which may be blocked by terminal hydroxyl groups and may additionally have been treated with fillers conferring hydrophobic properties. Those polyaryl siloxane oils and especially polyalkyl siloxane oils are preferred in which aryl, preferably is phenyl and the alkyl radicals have especially 1 to 6 carbon atoms, examples being polymethylphenylsiloxanes, polymethylhydrogen-siloxanes and in particular polydimethylsiloxanes, having mean molecular weights from 1,000 to 100,000, preferably 5,000 to 40,000, and having a kinematic viscosity at 25° C. of at least 0.7, preferably 10 to 3,000 and in particular 40 to 1,000 mm$^2$/second. Before the treatment with fillers conferring hydrophobic properties, the preferred methylpolysiloxanes, unless they have been blocked with terminal hydroxyl groups, possibly are of the probable formula

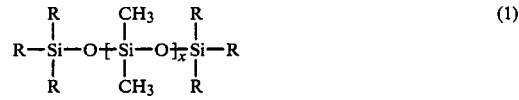
(1)

in which R is in each case methyl or methoxy and x is an integer greater than 1, for example having values from 50 to 1,200 or higher.

Preferably, the silicone oils described contain conventional additives, such as emulsifiers based on polyethylene and especially fillers conferring hydrophobic properties. As a rule, the silicone oils employed according to the invention, especially the polyalkylsiloxane oils blocked with terminal hydroxyl groups, can contain small amounts, for example 1 to 10, preferably 3 to 6, percent by weight of fillers which confer hydrophobic properties and which are present in a finely disperse state, such as graphite, talc, bentonite, kieselguhr, $TiO_2$ or particularly $SiO_2$. Accordingly the polyalkylsiloxane oils employed as the preferred component (c) have a viscosity of 10 to 3,000 mm²/second at 25° C., may be blocked with terminal hydroxyl groups and have at least partially been treated with 1 to 10 percent by weight of finely disperse silica.

In order to impart particularly hydrophobic properties to the silicone oils, these oils are treated, by grinding, with the fillers conferring hydrophobic properties, for example, finely disperse silica. The treatment at high temperatures of, for example, 60° to 250° C., wherein, for example, so-called pyrogenic silica is obtained, is also successful. It is possible to perform grinding alone or a heat treatment alone. However, grinding can also be combined with heat treatment in a single step. Finely disperse silica is understood as silica having a particle size of, for example, 0.2 to 5 μm and a specific surface area of, for example, 200 to 400 g/m². Inter alia, the treatment of polydimethylsiloxanes with silica is described in "Emulsions, Latices and Dispersions" under the title "Experimental Researches on Silicon Antifoams" by S. Ross and G. Nishioka, pages 237 to 256, (Edition 1978, Paul Becher, New York, Basel).

To obtain optimum hydrophobic properties of component (c) in the compositions according to the invention, it has been found to be particularly advantageous to use mixtures of polysiloxane oils, which have been treated as described above, with untreated polysiloxane oils.

Accordingly, mixtures of untreated polydimethylsiloxane oils, having a viscosity of 40 to 1,000 mm²/second at 25° C., and of polydimethylsiloxane oils of the indicated type, which have been treated before use with 3 to 6 percent by weight of a silica, having a surface area of 200 to 400 m²/g, by grinding and/or heat treatment at 60° to 250° C., are of prevailing interest as component (c). As a rule, such mixtures contain 40 to 60 percent by weight of untreated polydimethylsiloxanes and 40 to 60 percent by weight of treated polydimethylsiloxanes of the indicated type. An example of commercially available silicone oil mixtures used as component (c) is a mixture of 50 percent by weight of RHODOSIL®V 47/350 (trade name of RHODIA/RHONE POULENC for untreated polydimethylsiloxane oils) and 50 percent by weight of DB 100 ANTIFOAM COMPOUND® (trade name of DOW CORNING for polydimethylsiloxane oils treated with silica).

To obtain a stable microemulsion of the polymer as component (a), the water-soluble solvent as component (b) and the silicone oil as component (c), it is necessary to add an anionic surfactant as component (d) to the composition according to the invention, if appropriate as a mixture with a non-ionic surfactant as the optional component (e). In order to ensure homogenisation of compositions which are free from silicone oil and which are preferably present as anhydrous organic solutions, the use of an anionic, or preferably non-ionic, surfactant or mixtures thereof as components (d) and/or (e), preferably (e), is also necessary. The selection of components (d) and (e) of the compositions is not critical. Thus, anionic surfactants which can be used as component (d) are preferably, for example, alkylene oxide adducts, such as acid adducts, containing ether groups or preferably ester groups of inorganic or organic acids, of alkylene oxides, in particular ethylene oxide and/or propylene oxide or also styrene oxide, to organic hydroxyl, carboxyl, amino and/or amido compounds having aliphatic hydrocarbon radicals with a total of at least 2 carbon atoms, or mixtures of these substances. These acid ethers or esters can be present as the free acids or, preferably, as salts, for example the alkali metal salts, alkaline earth metal salts, ammonium salts or amine salts. Ammonium salts and alkali metal salts, in particular sodium salts, are preferred.

These anionic surfactants are prepared by known methods, by adding at least 1 mol, preferably more than 1 mol, for example 2 to 60 mols, of ethylene oxide or propylene oxide, or ethylene oxide and propylene oxide alternately in any order, to the above organic compounds and subsequently etherifying or esterifying the adducts and, if desired, preferably converting the ethers or esters into their salts with the appropriate bases. Thus, for example, the preferred ammonium or sodium salts are obtained with ammonia or sodium hydroxide. The base materials are higher fatty alcohols, viz. alkanols or alkenols each having 8 to 20 carbon atoms, dihydric to hexahydric aliphatic alcohols having 2 to 9 carbon atoms, alicyclic alcohols, phenylphenols, benzylphenols, alkylphenols having one or several alkyl substituents, which in total has or have at least 4 carbon atoms, fatty acids having 8 to 22 carbon atoms and amines having aliphatic and/or cycloaliphatic hydrocarbon radicals having at least 8 carbon atoms, and in particular fatty amines, hydroxyalkylamines, hydroxyalkylamides and aminoalkyl esters, carrying radicals of this type, of fatty acids or dicarboxylic acids and more highly alkylated aryloxycarboxylic acids.

Further examples of anionic surfactants are:

sulfated aliphatic alcohols, the alkyl chain of which has 8 to 18 carbon atoms, for example sulfated lauryl alcohol;

sulfated unsaturated fatty acids or fatty acid lower alkyl esters, which have 8 to 20 carbon atoms in the fatty radical, for example ricinoleic acid and oils containing such fatty acids, for example castor oil;

alkylsulfonates, the alkyl chain of which contains 8 to 20 carbon atoms, for example dodecylsulfonate;

alkylarylsulfonates with a straight-chain or branched alkyl chain having at least 6 carbon atoms, for example dodecylbenzenesulfonates or 3,7-diisobutyl-naphthalenesulfonates;

sulfonates of polycarboxylic acid esters, for example dioctyl sulfosuccinates or sulfosuccinamides;

the alkali metal, ammonium or amine salts, which are termed soaps, of fatty acids having 10 to 20 carbon atoms, for example colophony salts;

esters of polyalcohols, in particular monoglycerides or diglycerides of fatty acids having 12 to 18 carbon atoms, for example monoglycerides of lauric, stearic or oleic acid, and the adducts of 1 to 60 mols of ethylene oxide and/or propylene oxide to fatty amines, fatty acids or fatty alcohols each having 8 to 22 carbon atoms, to alkylphenols having 4 to 16 carbon atoms in the alkyl chain or to trihydric to hexahydric alkanols having 3 to 6 carbon atoms, which adducts have been converted into an acidic ester with an organic dicarboxylic acid, for example maleic acid, malonic acid or sulfosuccinic acid, but preferably with an inorganic polybasic acid, such as o-phosphoric acid or especially sulfuric acid.

Examples of very suitable anionic surfactants, to be considered especially within the scope of the present invention as component (d) of the composition, are sulfonated benzyl-alkyl-benzimidazoles or salts thereof, preferably alkylphenyl-sulfonates or salts thereof and in particular acidic esters, or salts thereof, of alkylene oxide adducts of a fatty alcohol or alkylphenols or mixtures thereof. Sulfonated 1-benzyl-2-alkylbenzimidazoles having 8 to 22, preferably 16 to 18, carbon atoms in the alkyl moiety, or salts thereof, preferably alkali metal salts, are preferred as component (d). The alkyl radicals are straight-chain or branched, saturated or unsaturated. Examples of alkyl radicals are n-octyl, tert.-octyl, n-nonyl, tert.-nonyl, n-decyl, n-dodecyl, tridecyl, myristyl, cetyl, stearyl or oleyl. Amongst sulfonated benzimidazole derivatives which can be obtained by a condensation reaction of o-phenylenediamine with saturated or unsaturated fatty acids having 12 to 18, preferably 16 to 18, carbon atoms (palmitic acid, stearic acid or oleic acid), those having 2 sulfonic acid groups, which may be present as sodium salts, are preferred. A preferred specific representative of a benzimidazole derivative of the indicated type is the disodium salt of 1-benzyl-2-heptadecylbenzimidazoledisulfonic acid.

The alkylphenylsulfonates as component (d) are as a rule salts, preferably alkali metal salts, of the corresponding monosulfonic acids having 8 to 18, preferably 8 to 12, carbon atoms in the alkyl moiety, the alkyl radicals being especially of the type indicated above. Dodecylbenzenesulfonate(sic) (sodium salt) is particularly suitable as component (d).

The alkylene oxide adducts of fatty alcohols or alkylphenols are preferred, as component (d), to the above described sulfonated benzimidazole derivatives and alkylphenyl-sulfonates. These are especially acidic esters, or salts thereof, of alkylene oxide adducts of a fatty alcohol having 8 to 22 carbon atoms or of an alkylphenol having 4 to 22 carbon atoms in the alkyl radical.

Acidic esters, or salts thereof, of a polyadduct of 2 to 30 mols of ethylene oxide to 1 mol of fatty alcohol having 8 to 22 carbon atoms or to 1 mol of alkylphenol having 4 to 12 carbon atoms in the alkyl moiety are also preferred.

The preferred components (d) can be represented, for example, by the formula

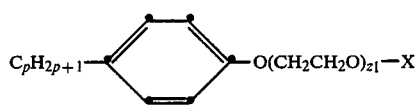

(2)

$C_pH_{2p+1}$—⟨benzene⟩—$O(CH_2CH_2O)_{z_1}$—X or the formula $R_1$—O—$(CH_2CH_2$—$O)_{z_1}$—X    (3)

in which $R_1$ is alkyl or alkenyl each having 8 to 22 carbon atoms, X is the acid radical of an inorganic, oxygen-containing acid or the radical of an organic acid, p is 4 to 12 and $z_1$ is 2 to 20.

The alkyl radicals on the benzene ring of formula (2) can be butyl, hexyl, n-octyl, n-nonyl, p-tert.-octyl, p-tert.-nonyl, decyl or dodecyl. Alkyl radicals having 8 to 12 carbon atoms, in particular octyl and nonyl radicals, are preferred.

The acid radical X is derived, for example, from low-molecular dicarboxylic acids, for example maleic acids, malonic acid, succinic acid or sulfosuccinic acid, and it is linked to the ethyleneoxy moiety of the molecule via an ester bridge. In particular, however, X is derived from inorganic polybasic acids, such as orthophosphoric acid and in particular sulfuric acid. The acid radical X is preferably present in the form of a salt, viz. as an alkali metal, ammonium or amine salt for example. Examples of such salts are lithium, sodium, potassium, ammonium, trimethylamine, ethanolamine, diethanolamine or triethanolamine salts.

Examples of the fatty alcohols for the preparation of component (d) of the formula (3) are those having 8 to 22, in particular 8 to 18, carbon atoms, such as octyl alcohol, decyl alcohol, lauryl alcohol, tridecyl alcohol, myristyl alcohol, cetyl alcohol, stearyl alcohol, oleyl alcohol, arachidyl alcohol or behenyl alcohol.

The esters are as a rule formed with the same acids as those mentioned for the compounds of formula (2).

Particularly preferred components (d) of the formula (3) are the sulfuric acid esters of adducts of 2 to 4 mols of ethylene oxide and 1 mol of fatty alcohol having 8 to 18 carbon atoms, or the alkali metal salts thereof.

A special embodiment of a component (d) of this type is the sodium salt of lauryl-triglycol-ether-sulfonic acid and that of the acidic sulfuric acid ester of the adduct of 3 to 4 mols of ethylene oxide to an industrial mixture of unsaturated fatty alcohols having 9 to 13 carbon atoms.

Particularly preferred components (d) of the formula (3) are the sulfuric or phosphoric acid esters of adducts of 2 to 12 mols of ethylene oxide and 1 mol of an alkylphenol having 8 to 12 carbon atoms in the alkyl radical, or the alkali metal, ammonium or amine salts thereof, and in particular the phosphoric acid esters of adducts of 8 to 12 mols of ethylene oxide and 1 mol of a p-alkylphenol having 8 to 12 carbon atoms in the alkyl radical, or the ammonium, potassium or sodium salts thereof.

Specific representatives of component (d) of the formulae (2) and (3) are:

(d)$_1$ ammonium salt of the acid sulfate of the adduct of 2 mols of ethylene oxide and 1 mol of p-tert.-nonylphenol;

(d)$_2$ sodium salt of the acid maleate of the adduct of 2 mols of ethylene oxide and 1 mol of p-nonylphenol;

(d)$_3$ ammonium salt of the acid sulfate of the adduct of 3 mols of ethylene oxide and 1 mol of p-butylphenol;

(d)$_4$ ammonium salt of the acid phosphate of the adduct of 2 mols of ethylene oxide and 1 mol of p-nonylphenol;

(d)$_5$ sodium salt of the disulfosuccinate of the adduct of 4 mols of ethylene oxide and 1 mol of n-octylphenol;

(d)$_6$ ammonium salt of the acid sulfate of the adduct of 9 mols of ethylene oxide and 1 mol of p-nonylphenol;

(d)$_7$ ammonium salt of the acid sulfate of the adduct of 6 mols of ethylene oxide and 1 mol of p-nonylphenol;

(d)$_8$ sodium salt of the monosulfosuccinate of the adduct of 2 mols of ethylene oxide and 1 mol of p-nonlyphenol;

(d)$_9$ ammonium salt of the acid sulfate of the adduct of 6 mols of ethylene oxide and 1 mol of dodecylphenol;

(d)$_{10}$ ammonium salt of the acid sulfate of the adduct of 2 mols of ethylene oxide and 1 mol of octylphenol;

(d)$_{11}$ ammonium salt of the acid sulfate of the adduct of 2 mols of ethylene oxide and 1 mol of ALFOL (1014)® (trade mark of CONTINENTAL OIL COMPANY, a mixture of decyl alcohol and tetradecyl alcohol);

(d)$_{12}$ ammonium salt of the acid sulfate of the adduct of 2 mols of ethylene oxide and 1 mol of stearyl alcohol;

(d)$_{13}$ ammonium salt of the acid sulfate of the adduct of 3 mols of ethylene oxide and 1 mol of 2-ethylhexanol;

(d)$_{14}$ ammonium salt of the acid sulfate of the adduct of 15 mols of ethylene oxide and 1 mol of stearyl alcohol;

(d)$_{15}$ ammonium salt of the acid sulfate of the adduct of 3 mols of ethylene oxide and 1 mol of tridecyl alcohol;

(d)$_{16}$ ammonium salt of the acid sulfate of the adduct of 4 mols of ethylene oxide and 1 mol of hydroabietyl alcohol;

(d)$_{17}$ ammonium salt of the acid sulfate of the adduct of 3 mols of ethylene oxide and 1 mol of lauryl alcohol;

(d)$_{18}$ di-($\beta$-hydroxyethyl)-amine salt of the acid sulfate of the adduct of 3 mols of ethylene oxide and 1 mol of lauryl alcohol;

(d)$_{19}$ sodium salt of the acid sulfate of the adduct of 2 mols of ethylene oxide and 1 mol of lauryl alcohol;

(d)$_{20}$ sodium salt of the acid sulfate of the adduct of 3 mols of ethylene oxide and 1 mol of lauryl alcohol;

(d)$_{21}$ acid phosphate of the adduct of 5 mols of ethylene oxide and 1 mol of 2-ethyl-n-hexanol;

(d)$_{22}$ ammonium salt of the acid sulfate of the adduct of 3 mols of ethylene oxide and 1 mol of an alcohol mixture having 20 to 22 carbon atoms;

(d)$_{23}$ disphosphate of the adduct of 8 mols of ethylene oxide and 1 mol of dodecylamine;

(d)$_{24}$ ammonium salt of the acid phosphate of the adduct of 8 mols of ethylene oxide and 1 mol of tallow fatty amine; and (d)$_{25}$ sodium salt of the acid phosphate of the adduct of 10 mols of ethylene oxide and 1 mol of p-nonylphenol.

The non-ionic surfactant as the optional component (e) advantageously is a non-ionic alkylene oxide adduct of 1 to 100 mols of an alkylene oxide, for example ethylene oxide and/or propylene oxide, and 1 mol of an aliphatic mono-alcohol having at least 4 carbon atoms, of an unsubstituted or alkyl-substituted or phenyl-substituted phenol or of a fatty acid having 8 to 22 carbon atoms.

The aliphatic mono-alcohols for the preparation of non-ionic surfactants are, for example, water-insoluble mono-alcohols having at least 4 carbon atoms, preferably 8 to 22 carbon atoms. These alcohols can be saturated or unsaturated and branched or straight-chain, and they can be used by themselves or as a mixture. Natural alcohols, for example myristyl alcohol, cetyl alcohol, stearyl alcohol or oleyl alcohol, or synthetic alcohols, such as in particular 2-ethylhexanol, and also trimethyhexanol, trimethylnonyl alcohol, hexadecyl alcohol or the said ALFOLS ® (trade mark of CONTINENTAL OIL COMPANY) can be reacted with the alkylene oxide.

Examples of suitable substituted or unsubstituted phenols are phenol, o-phenylphenol or alkylphenols, the alkyl radical of which has 1 to 16, preferably 4 to 12, carbon atoms. Examples of these alkylphenols are p-cresols, butylphenol, tributylphenol, octylphenol and especially nonylphenol.

The fatty acids have preferably 8 to 12 carbon atoms and can be saturated or unsaturated, for example capric acid, lauric acid, myristic acid, palmitic acid or stearic acid, or decenoic acid, dodecenoic acid, tetradecenoic acid, hexadecenoic acid, oleic acid, linoleic acid, linolenic acid or, preferably ricinoleic acid.

Further examples of non-ionic surfactants are:

adducts of preferably 5 to 80 mols of alkylene oxides, in particular ethylene oxide, it being possible for individual ethylene oxide units to be replaced by substituted epoxides, such as styrene oxide and/or propylene oxide, with higher unsaturated or saturated fatty alcohols, fatty acids, fatty amines or fatty amides having 8 to 22 carbon atoms, or with phenylphenols or alkylphenols, the alkyl radicals of which have at least 4 carbon atoms;

alkylene oxide condensation products, in particular ethylene oxide and/or propylene oxide condensation products; and reaction products of a fatty acid having 8 to 22 carbon atoms with a primary or secondary amine containing at least one hydroxy-lower alkyl group or lower alkoxy-lower alkyl group, or alkylene oxide adducts of these reaction products containing hydroxyalkyl groups, the reaction taking place in such a way that the molar ratio between hydroxyalkylamine and fatty acid can be 1:1 and greater than 1, for example 1.1:1 to 2:1.

Examples of very suitable non-ionic surfactants to be considered especially within the scope of the present invention as the optional component (e) of the composition are fatty acid dialkanolamides, especially fatty alcohols or, in particular, alkylene oxide adducts of a fatty alcohol, a fatty acid or an alkylphenol.

Preferred fatty acid dialkanolamides have 8 to 22 carbon atoms in the fatty acid radical and 2 to 18 carbon atoms in the alkanol radical. These are, for example, fatty acid/alkanolamine reaction products which are prepared from fatty acids having 8 to 22, preferably 8 to 18, carbon atoms and alkanolamines having 2 to 6 carbon atoms, such as ethanolamine, diethanolamine, isopropanolamine or di-isopropanolamine, diethanolamine being preferred. Fatty acid diethanolamides having 8 to 18 carbon atoms are particularly preferred. Examples of suitable fatty acids are caprylic acid, capric acid, lauric acid, myristic acid, palmitic acid, stearic acid, arachic acid, behenic acid, oleic acid, linoleic acid, linolenic acid, arachidonic acid or coconut fatty acid. Preferred examples of the reaction products of this type are coconut fatty acid diethanolamide, lauric acid diethanolamide or stearic acid diethanolamide.

Fatty alcohols having 8 to 22 carbon atoms or adducts thereof with preferably 1 to 3 mols of ethylene oxide are a further preferred embodiment of the non-ionic surfactants for component (e).

This is a fatty alcohol of the type defined which can be ethoxylated and the HLB value of which advantageously is 0.1 to 10, in particular 0.6 to 10. Components (e) having HLB values in the range from 0.1 to 7.0 have proved to be particularly advantageous. The HLB value is a measure of the "Hydrophilic-Lipophilic Balance" in a molecule. The HLB values can be determined experimentally by the method of W. C. Griffin, ISCC 5, 249 (1954) or J. T. Davis, Tenside Detergents 11 (1974), No. 3, page 133, or can be calculated. The fatty alcohols used can be saturated or unsaturated. Preferably they contain 12 to 18 carbon atoms. Examples of such alcohols are lauryl alcohol, myristyl alcohol, cetyl alcohol, stearyl alcohol, oleyl alcohol, arachidyl alcohol, behenyl alcohol and $C_{12}$–$C_{22}$-ALFOLS®. Advantageously, these fatty alcohols can be monoethoxylated, diethoxylated or triethoxylated. Preferred components (e) of this type are cetyl alcohol and diethylene glycol cetyl ether (=polyoxyethylene-(2)-cetyl ether) of the formula $C_{16}H_{33}$-O-$(CH_2CH_2O)_2$-H.

As the non-ionic surfactants for the optional component (e), alkylene oxide adducts are preferred to the fatty acid dialkanolamides and fatty alcohols of the type indicated above. These alkylene oxide adducts are, for example, adducts of both propylene oxide and ethylene oxide, or adducts of propylene oxide or, in particular, ethylene oxide.

Propylene oxide/ethylene oxide adducts are, for example, of the formula

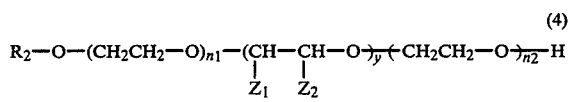

(4)

in which $R_2$ is hydrogen, alkyl or alkenyl having at most 18 carbon atoms, preferably 8 to 16 carbon atoms, o-phenylphenyl or alkylphenyl having 4 to 12 carbon atoms in the alkyl moiety, one of $Z_1$ and $Z_2$ is hydrogen and the other is methyl, y is 1 to 15 and the sum of $n_1+n_2$ is 3 to 15. Particularly advantageous non-ionic surfactants of this type are mixed fatty alcohol polyglycol ethers, in particular adducts of 3 to 10 mols of ethylene oxide and 3 to 10 mols of propylene oxide with aliphatic monoalcohols having 8 to 16 carbon atoms. Further examples are an adduct of 12 mols of ethylene oxide and 12 mols of propylene oxide with 1 mol of a $C_4$–$C_{18}$-fatty alcohol, an adduct of 5 mols of ethylene oxide and 5 mols of propylene oxide with 1 mol of a mixture of dodecyl alcohol and tetradecyl alcohol, an adduct of 9 mols of ethylene oxide and 7 mols of propylene oxide with 1 mol of $C_{16}$–$C_{18}$-fatty alcohol and an adduct of 9.5 mols of ethylene oxide and 9.5 mols of propylene oxide with 1 mol of nonylphenol.

Preferred adducts of ethylene oxide alone for the optional component (e) are especially adducts of 4 to 15 mols of ethylene oxide with 1 mol of a mono-alcohol having 4 to 22 carbon atoms, and in particular adducts of 2 to 15 mols of ethylene oxide with 1 mol of a fatty acid having 8 to 22 carbon atoms or 1 mol of an alkylphenol having 4 to 12 carbon atoms in the alkyl radical.

Examples of suitable alcohol/ethylene oxide adducts are adducts of 2 to 15 mols, preferably 7 to 15 mols, of ethylene oxide with 1 mol of an aliphatic mono-alcohol having 8 to 22 carbon atoms.

The aliphatic mono-alcohols can be saturated or unsaturated and can be used alone or as mixtures. Natural alcohols, for example, lauryl alcohol, myristyl alcohol, cetyl alcohol, stearyl alcohol, oleyl alcohol and industrial mixtures of unsaturated fatty alcohols having 9 to 13 carbon atoms, or synthetic alcohols, such as especially 2-ethylhexanol and also trimethylhexanol, trimethylnonyl alcohol, hexadecyl alcohol or $C_{12}$–$C_{22}$-ALFOLS®, can be reacted with ethylene oxide.

Ethylene oxide adducts of 2 to 15 mols of ethylene oxide with 1 mol of fatty acid are also preferred. The fatty acids in these products preferably have 10 to 20 carbon atoms and can be saturated or unsaturated, for example capric acid, lauric acid, myristic acid, palmitic acid or stearic acid, or decenoic acid, dodecenoic acid, tetradecenoic acid, hexadecenoic acid, oleic acid, linoleic acid or ricinoleic acid.

Particularly preferred ethylene oxide adducts with alkylphenols advantageously are ethylene oxide adducts of octylphenol or preferably nonylphenol, having 2 to 12 ethylene oxide units; these can be represented in particular by the formula

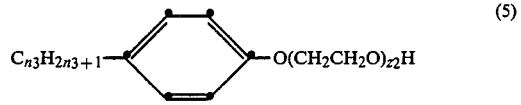

(5)

in which $n_3$ is 8 or 9 and $z_2$ is 2 to 12. The alkyl substituents on the phenol ring can be straight-chain or branched. In detail, the following are reaction products of octylphenol and nonylphenol: p-nonylphenol/9 mols of ethylene oxide, p-octylphenol/2 mols of ethylene oxide, p-nonylphenol/10 mols of ethylene oxide and p-nonylphenol/11 mols of ethylene oxide. Further alkylphenol/ethylene oxide adducts can be derived, for example, from butylphenol or tributylphenol.

The optional component (f) is employed in the composition according to the invention only if a defoaming and deaerating action of the composition is desired even at high electrolyte concentrations and/or high temperatures, and especially if a long-lasting action in this respect is desired.

The preferred optional components (f) are commercially available, surface-active, hydrophilic adducts of an organopolysiloxane with ethylene oxide and/or propylene oxide.

The organopolysiloxanes, as the starting product for adducts of this type, in principle correspond to the commercially available silicone oils which have been mentioned above for component (c) and which are described in German Auslegeschrift 2,031,827. Amongst these silicone oils, polydimethylsiloxanes are in turn of prevailing interest. The siloxanoxyalkylene copolymers which can be used as the optional component (f) can, for example, be prepared from halogen-substituted organopolysiloxanes, in particular polydimethylsiloxanes, and alkali metal salts of polyoxyalkylene glycols, for example, polyethylene glycol and/or polypropylene glycol.

These siloxanoxyalkylene copolymers are polyether-siloxanes which advantageously have a cloud point at about 20° to 70° C., preferably 25° to 50° C. The glycol content consisting of oxyethylene groups or oxyethylene and oxypropylene groups is advantageously 35 to 85, preferably 40 to 75, per cent by weight, relative to the total weight of the polyether-siloxane.

A preferred embodiment of the optional component (f) accordingly is a water-soluble block polymer of a polydimethylsiloxane and ethylene oxide or a copolymer of ethylene oxide and propylene oxide, which block polymer has a dynamic viscosity of 500 to 3,000 mPa.s (Brookfield LVT, Spindel 3, 30 rpm) at 25° C. and a cloud point from 20° to 70° C.

Block polymers or polyether-siloxanes of this type can be represented by the probable formula

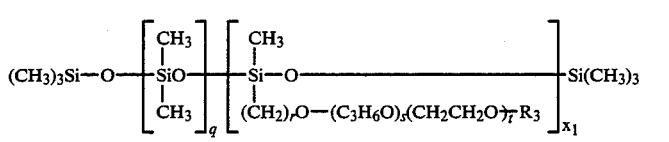

in which q is 3 to 50, preferably 3 to 25, r is 2 or 3, s is 0 to 15, t is 1 to 25, $x_1$ is 3 to 10 and $R_3$ is alkyl having 1 to 4 carbon atoms, preferably methyl.

Examples of polyether-siloxanes of this type are described in German Auslegeschrift 1,719,238 and in U.S. Pat. Nos. 2,834,748, 3,389,160 and 3,505,377.

Further polyether-siloxanes which can be used as the optional component (f) are of the probable formula

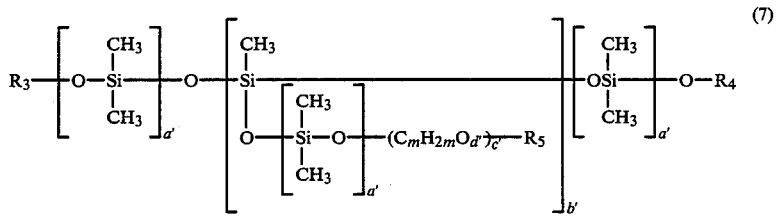

in which $R_3$ and $R_4$ are each alkyl having 1 to 4 carbon atoms, preferably methyl, a' is 1 to 20, b' is 2 to 20, c' is up to 50, d' is 1 or 2, preferably 1, and m is 2 to 5.

Siloxane compounds of this type are described in German Auslegeschrift 1,795,557.

An example of a suitable, commercially available optional component (f), of the probable formula (6) and having a cloud point of 32° C., is SILICONSURFACTANT L 546 ® (trade mark of UNION CARBIDE).

To improve the storage stability of the composition according to the invention, the optional component (g) can additionally be employed. For this, commercially available hydrocarbon mixtures, in particular aliphatic straight-chain or branched hydrocarbons, which may be mixed with naphthenes and aromatics, are preferred. Mixtures of this type have a high boiling range of about 180° to about 500° C., an aniline point of about 70° to about 120° C. and a kinematic viscosity of about 1 to about 100 mm²/second at 20° C. Examples of purely aliphatic hydrocarbon mixtures are straight-chain hydrocarbons having a boiling range from 170° to 250° C., an aniline point from 80° to 85° C. and a kinematic viscosity of 1.6 to 2 mm²/second at 25° C., which are obtainable as SHELLSOL TD, T or K ® (trade mark of SHELL). Examples of purely aliphatic hydrocarbon mixtures with branched chains are mixtures having a boiling range from 110° to 260° C., an aniline point from 75° to 90° C. and a kinematic viscosity of 20 to 300 mm²/second at 25° C., which are obtainable as ISO-PAR E, G, H, K, L or M ® (trade mark of ESSO). Hydrocarbon mixtures which, in addition to aliphatics, also contain naphthenes and aromatics, for example mixtures consisting of 45 to 70 percent by weight of paraffins, 25 to 45 percent by weight of naphthenes and 5 to 20, in particular 7 to 9, percent by weight of aromatics, can also be used.

Mixtures of this type have as a rule a boiling range from 340° to 470° C., a kinematic viscosity of 20 to 100 mm²/second at 20° C., a so-called "pour point" of −5° to −50° C. and an aniline point of 75° to 110° C. An example of a readily accessible, commercially available hydrocarbon mixture which, for example, can be used as the optional component (g) is PROCESSOIL ES 320 ® (trade mark of ESSO).

If component (g) is employed for the preparation of component (a), an addition of the solvent as component (b) in the composition according to the invention is necessary.

A conventional additive as the optional component (h), especially in the case of compositions which contain silicone oil and the optional component (c), is preferably deionised water. If necessary, an alkali or an alkali metal hydroxide, such as say ammonia, potassium hydroxide or sodium hydroxide, can also be employed, as a rule as an aqueous solution. In the case of compositions free from silicone oil, which do not contain the optional component (c), especially high-molecular acids, in particular $C_{12}$–$C_{22}$-fatty acids, such as say stearic acid or oleic acid, can be used as the optional component (h).

Preferred compositions contain in general 8 to 30, preferably 10 to 30, in particular 15 to 20, percent by weight of component (a), 10 to 40, preferably 15 to 30, percent by weight of component (b), 0 to 20, preferably 2 to 20, in particular 5 to 15, percent by weight of component (c), 0 to 20, preferably 2 to 20, in particular 5 to 10, percent by weight of component (d), 0 to 10, preferably 2 to 10, in particular 2 to 5, percent by weight of component (e), 0 to 10, preferably 1 to 10, in particular 1 to 5, percent by weight of component (f), 0 to 50, preferably 2 to 40, in particular 2 to 10, percent by weight of component (g) and 0 to 70, preferably 2 to 70, in particular 10 to 50, percent by weight of component (h), the sum of components (a) to (h) always heading up to 100 percent by weight and at least one of the two optional components (d) and (e), if appropriate, being employed as an aqueous commercial formulation.

Compositions free from silicone oil contain, in particular, 10 to 30, preferably 15 to 20, percent by weight of component (a), 10 to 40, preferably 15 to 30, percent by weight of component (b), 2 to 10, preferably 2 to 5, percent by weight of component (e), 2 to 10, preferably 5 to 10, percent by weight of component (f), 20 to 50, preferably 30 to 40, percent by weight of component (g) and 0 to 10, preferably 2 to 5, percent by weight of component (h).

Compositions containing silicone oil contain, in particular, 10 to 30, preferably 15 to 20, percent by weight of component (a), 10 to 40, preferably 15 to 30, percent by weight of component (b), 2 to 20, preferably 5 to 15, percent by weight of component (c), 2 to 20, preferably 5 to 10, percent by weight of component (d), 0 to 10, preferably 2 to 5, percent by weight of component (e), 0 to 5, preferably 1 to 3, percent by weight of component (f), 0 to 10, preferably 2 to 10, percent by weight of component (g) and 10 to 70, preferably 10 to 50 percent by weight of component (h).

The compositions which contain silicone oil and are of prevailing interest, contain the optional component (e), but not the optional components (f) and (g) or alternatively they contain in particular the optional components (f) and (g), but not the optional component (e). Accordingly, such compositions contain 15 to 20 percent by weight of component (a), 15 to 30 percent by weight of component (b), 5 to 15 percent by weight of component (c), 5 to 10 percent by weight of component (d), 2 to 5 percent by weight of component (e), and 10 to 70 percent by weight of water, or in particular 10 to 20 percent by weight of component (a), 15 to 30 percent by weight of component (b), 5 to 15 percent by weight of component (c), 5 to 10 percent by weight of component (d), 1 to 3 percent by weight of component (f), 2 to 10 percent by weight of component (g) and 10 to 50 percent by weight of water.

The process for the preparation of the compositions according to the invention comprises initially introducing components (a) and (b) and mixing into these first, if appropriate, the optional component (c), then, if appropriate, the optional components (g) and then (f), and finally at least one of the components (d) and (e) together at 10° to 30° C. and, if appropriate, finally adding component (h), the order in which the various components are mixed being critical. In the case of compositions containing silicone oil, (a) and (b) are initially introduced and then mixed together, if appropriate, with (g) and then (f), and finally (d), if appropriate as a mixture with (e).

$1 \times 10^{-7}$ to 10 g of the composition according to the invention per liter of aqueous system are preferably employed in the application process for defoaming aqueous systems.

In the defoaming or deaerating of aqueous dye liquors or printing pastes, in particular 0.1 to 1.0 g of the composition are employed per liter of dye liquor, and 1 to 10 g of the composition are employed per kg of printing paste. The quantity ... (sic) is preferably $1 \times 10^{-7}$ to $1 \times 10^{-3}$ g of composition per liter of effluent in defoaming or deaerating of industrial effluents, in particular $1 \times 10^{-7}$ to $1 \times 10^{-6}$ of the composition per liter of effluent in the activated sludge tank of effluent treatment plants, and in particular $1 \times 10^{-4}$ to $1 \times 10^{-2}$ of the composition per liter of effluent from the alkaline pulping of wood in cellulose manufacture or per liter of wash water from industrial waste-air purification plants.

The compositions containing silicone oil have the substantial advantage of their versatile applicability not only in the defoaming of industrial effluent, even at high pH values, as is the case in the alkaline pulping of wood, but also in the deaeration of aqueous dye liquors or printing pastes. When defoaming industrial effluents, in particular those from the alkaline pulping of wood at high pH values, it is also possible effectively to employ the compositions, according to the invention, which are free from silicone oil and which are more accessible and less expensive than the compositions according to the invention, which contain silicone oil. Both the compositions containing silicone oil and the compositions free from silicone oil are, moreover, storage-stable as aqueous emulsions or organic solutions.

Parts and percentages given in the preparation instructions and examples which follow are parts and percent by weight.

PREPARATION INSTRUCTIONS FOR COMPONENT (A) OF THE COMPOSITION ACCORDING TO THE INVENTION

Instructions A

Homopolymerisation of ethyl acrylate in ethylhexanol

In an inert nitrogen atmosphere, 50 parts of ethyl acrylate are dissolved in 50 parts of 2-ethyl-n-hexanol, and the solution is heated to 80° C. The reaction mixture is kept for 8 hours at this temperature under a nitrogen atmosphere, and 0.5 part of benzoyl peroxide is in each case added as a catalyst to the reaction mixture at the start of the reaction time of 8 hours, after one hour of reaction time and after two hours of reaction time. Subsequently, the reaction mixture is cooled to 30° C. and diluted with 25 parts of 2-ethyl-n-hexanol. This gives a 40% clear solution of the homopolymer in 2-ethyl-n-hexanol, the dynamic viscosity of the solution being 448 mPa.s (Brookfield LVT, Spindel 3, 30 rpm) at 25° C.

Instructions B

Homopolymerisation of butyl acrylate in ethylhexanol

In an inert nitrogen atmosphere, 25 parts of n-butyl acrylate are dissolved in 25 parts of 2-ethyl-n-hexanol and the solution is heated to 70° C. 0.03 part of azodiisobutyronitrile is added as a catalyst to the reaction mixture, the temperature of the reaction mixture rising in the course of 4 minutes from 70° C. to 76° C. A solution of 125 parts of n-butyl acrylate in 125 parts of 2-ethyl-n-hexanol is then added to the reaction mixture in the course of 165 minutes. At the start of the addition time of 165 minutes, and also after 35, 70 and 105 minutes of addition, 0.3 part of azodiisobutyronitrile is added in each case to the reaction mixture. All together, viz. from the start of addition, the reaction mixture is kept for 8 hours at 70° to 76° C. under an inert nitrogen atmosphere. Subsequently, the reaction mixture is cooled to 25° C. This gives a 50% clear solution of the homopolymer, the dynamic viscosity of the solution being 2,008 mPa.s (Brookfield LVT, Spindel 3, 30 rpm) at 25° C.

Instructions C

Homopolymerisation of ethylhexyl acrylate in ethylhexanol

The procedure described in Instructions A is repeated, except that 50 parts of 2-ethyl-n-hexyl acrylate are used and, after the reaction time of 8 hours, the reaction mixture is cooled to 25° C. without dilution with 2-ethyl-n-hexanol, affording a 50% clear solution of the homopolymer in 2-ethyl-n-hexanol, the viscosity of the solution being 560 mPa.s at 25° C., measured as in Instructions A.

Instructions D

Homopolymerisation of butyl acrylate in trimethylbenzene

The procedure described in Instructions A is repeated, except that 50 parts of n-butyl acrylate and 50 parts of trimethylbenzene (technical isomer mixture) are used and the reaction mixture is cooled to 25° C. after the reaction time of 8 hours, affording a 50% clear solution of the homopolymer in trimethylbenzene, the viscosity of the solution being 135 mPa.s at 25° C., measured as in Instructions A.

Instructions E

Homopolymerisation of butyl acrylate in trimethylhexanol

The procedure described in Instructions A is repeated, except that 50 parts of n-butyl acrylate and 50 parts of trimethylhexanol (technical mixture of primary iso-nonanols with 3,5,5-trimethylhexanol as the main constituent) are used and the reaction mixture is cooled to 25° C. after the reaction time of 8 hours, affording a 50% clear solution of the homopolymer in trimethylhexanol, the viscosity of the solution being 3,000 mPa.s at 25° C., measured as in Instructions A.

Instructions F

Homopolymerisation of butyl acrylate in an adduct of glycerol and propylene oxide The procedure described in Instructions A is repeated, except that 50 . . . (sic) n-butyl acrylate and 50 parts of a reaction product of glycerol and propylene oxide (molecular weight of the reaction product: 4,000) are used and the reaction mixture is cooled to 25° C. after the reaction time of 8 hours, affording a 50% clear solution of the homopolymer in the adduct of glycerol and propylene oxide, the viscosity of the solution being 2,985 mPa.s at 25° C., measured as in Instructions A.

Instructions G

Homopolymerisation of butyl acrylate in cyclohexanol

The procedure described in Instructions A is repeated, except that 50 parts of n-butyl acrylate and 50 parts of cyclohexanol are used and the reaction mixture is cooled to 25° C. after the reaction time of 8 hours, affording a 50% clear solution of the homopolymer in cyclohexanol, the viscosity of the solution being 580 mPa.s at 25° C., measured as in Instructions A.

Instructions H

Homopolymerisation of butyl acrylate in hexanol

In an inert nitrogen atmosphere, 16.7 parts of n-butyl acrylate are dissolved in 50 parts of n-hexanol and the solution is heated to 75° C. 0.25 part of azodiisobutyronitrile is added as a catalyst to the reaction mixture, the temperature of the reaction mixture rising from 75° C. to 82° C. in the course of 3 minutes. Subsequently, a solution of 183.3 parts of n-butyl acrylate in 150 parts of n-hexanol is added to the reaction mixture in the course of 2 hours. 45 minutes and 90 minutes after the start of the addition, and 1 hour after the end of the addition, 0.25 part of azodiisobutyronitrile is added in each case to the reaction mixture. All together, viz. from the start of the addition, the reaction mixture is kept at 75° to 82° C. for 10 hours under an inert nitrogen atmosphere. Subsequently, the reaction mixture is cooled to 25° C. This gives a 50% clear solution of the homopolymer, the viscosity of the solution being 248 mPa.s at 25° C., measured as in Instructions A.

Instructions I

Homopolymerisation of butyl acrylate in octanol

The procedure described in Instructions H is repeated, except that n-octanol is used in place of n-hexanol, affording a 50% clear solution of the homopolymer, the viscosity of the solution being 440 mPa.s at 25° C., measured as in Instructions A.

Instructions J

Copolymerisation of ethyl acrylate and acrylic acid in a weight ratio of 19:1 in ethylhexanol In an inert nitrogen atmosphere, 118.75 parts of ethyl acrylate and 6.25 parts of acrylic acid are dissolved in 125 parts of 2-ethyl-n-hexanol and the solution is heated to 80° C. 0.5 part of azodiisobutyronitrile is added to the reaction mixture, the temperature of the reaction mixture rising from 80° C. to 88° C. in the course of 2 minutes. Subsequently, a solution of 118.75 parts of ethyl acrylate and 6.25 parts of acrylic acid in 125 parts of 2-ethyl-n-hexanol is added to the reaction mixture in the course of one hour. 30 minutes after the start of the addition time of one hour, and also one hour and two hours after the end of the addition, 0.5 part of azodiisobutyronitrile is in each case added to the reaction mixture. All together, viz. from the start of the addition, the reaction mixture is kept at 80° to 88° C. for 6½ hours under an inert nitrogen atmosphere. Subsequently, the reaction mixture is cooled to 25° C. This gives a 50% clear solution of the copolymer in 2-ethyl-n-hexanol, the viscosity of the solution being 2,920 mPa.s at 25° C, measured as in Instructions A.

Instructions K

Copolymerisation of butyl acrylate and styrene in a weight ratio of 2.33:1 in ethylhexanol In an inert nitrogen atmosphere, 35 parts of n-butyl acrylate and 15 parts of styrene are dissolved in 50 parts of 2-ethyl-n-hexanol and the solution is heated to 80° C. 0.5 part of benzoyl peroxide is added to the reaction mixture, the temperature of the reaction mixture rising from 80° C. to 89° C. A solution of 35 parts of n-butyl acrylate and 15 parts of styrene in 50 parts of 2-ethyl-n-hexanol is then added to the reaction mixture in the course of 30 minutes. Immediately after the end of the addition, and 1, 2, 3, 4 and 5 hours after the end of the addition, 0.5 part of benzoyl peroxide is in each case added to the reaction mixture. All together, viz. from the start of the addition, the reaction mixture is kept at 80° to 89° C. for 8 hours under an inert nitrogen atmosphere. Subsequently, the reaction mixture is cooled to 25° C. This gives a 50% clear solution of the copolymer in 2-ethyl-n-hexanol, the viscosity of the solution being 1,300 mPa.s at 25° C., measured as in Instructions A.

Instructions L

Homopolymerization of butyl methacrylate in 2-ethylhexanol

The procedure described in Instructions A is repeated, except that 50 parts of butyl methacrylate and 50 parts of 2-ethylhexanol are used, affording a 50% solution, having a viscosity of 1,200 mPa.s at 25° C., measured as in Instructions A.

Instructions M

Homopolymerisation of butyl acrylate in straight-chain paraffins

The procedure described in Instructions A is repeated, except that 50 parts of n-butyl acrylate and 50 parts of a technical mixture of straight-chain, aliphatic hydrocarbons (boiling range 186°–214° C., kinematic viscosity 1.8 mm$^2$/second at 25° C., aniline point 85° C.)

are used, affording a 50% solution, having a viscosity of 605 mPa.s at 25° C., measured as in Instructions A.

Instructions N

Homopolymerisation of butyl acrylate in isoparaffins

The procedure described in Instructions A is repeated, except that 50 parts of n-butyl acrylate and 50 parts of a technical mixture of aliphatic hydrocarbons having branched chains (boiling range 192°–210° C., kinematic viscosity 21 mm$^2$/second at 25° C., aniline point 85° C.) are used, affording a 50% solution, having a viscosity of 590 mPa.s at 25° C., measured as in Instructions A.

EXAMPLE 1

35 parts of the 50% solution, according to Instructions B, of the homopolymer of n-butyl acrylate as component (a) in 2-ethyl-n-hexanol as component (b) are initially introduced. At intervals of 10 minutes each, the following components are mixed in one after the other at 20° C., with stirring:

10 parts of a polydimethylsiloxane as component (c), which has a kinematic viscosity of 400 mm$^2$/second at 25° C. and of which 50% are untreated and 50% have been treated with silica having a surface area of 300 m$^2$/g at 150° C., 8 parts of 2-ethyl-n-hexanol as component (b), 5 parts of a hydrocarbon mixture consisting of 63% of paraffins, 29% of naphthenes and 8% of aromatics, as component (g), of which the boiling range is 340° to 470° C., the kinematic viscosity is 43 mm$^2$/second at 25° C., the pour point of which is −15° C. and the aniline point is 97° C., 2 parts of a water-soluble polydimethylsiloxane modified with ethylene oxide, as component (f), of which the viscosity is 1,200 mPa.s at 25° C. (Brookfield LTV, Spindel 3, 30 rpm) and the cloud point is 32° C., and which is of the formula (6) in which s is zero and $R_3$ is methyl, and finally 7 parts of the sodium salt of the acid phosphate of the adduct of 10 mols of ethylene oxide with 1 mol of p-nonylphenol, as component (d).

Stirring of the mixture obtained is then continued at 20° C. for an additional hour, until complete homogenisation is obtained. As component (h), 32 parts of deionised water and then finally 1 part of an aqueous 30% sodium hydroxide solution are then added at 20° C. within the course of 1 hour to the homogeneous mixture, with continuous stirring.

Finally, stirring of the mixture is continued for a further ½ hour at 20° C. 100 parts of a readily pourable, storage-stable, finely disperse, aqueous emulsion are obtained.

EXAMPLE 2

The procedure described in Example 1 is repeated, except that 60 parts of the 50% solution, according to Instructions C of the homopolymer of 2-ethyl-n-hexyl acrylate as component (a) in 2-ethyl-n-hexanol as component (b) are initially introduced and subsequently 12 parts of the component (c) indicated in Example 1, 10 parts of 2-ethyl-n-hexanol as component (b), 6 parts of a mixture, as component (d), of 33.3% of the acid phosphate of the adduct of 5 mols of ethylene oxide with 1 mol of 2-ethyl-n-hexanol and 66.7% of the sodium salt of the acid sulfate of the adduct of 2 mols of ethylene oxide with 1 mol of lauryl alcohol and, finally, 22 parts of deionised water as component (h) are introduced one after the other, likewise affording a readily pourable, storage-stable, finely disperse, aqueous emulsion.

In place of 60 parts of the 50% solution, according to Instructions C, of the homopolymer of 2-ethyl-n-hexyl acrylate as component (a) in 2-ethyl-n-hexanol as component (b), it is also possible to employ 60 parts of the 50% solution, according to Instructions B, of the homopolymer of n-butyl acrylate as component (a) in 2-ethyl-n-hexanol as component (b), 60 parts of the 50% solution, according to Instructions J, of the copolymer of ethyl acrylate and acrylic acid as component (a) in 2-ethyl-n-hexanol as component (b), or 60 parts of the 50% solution, according to Instructions K, of the copolymer of n-butyl acrylate and styrene as component (a) in 2-ethyl-n-hexanol as component (b).

EXAMPLE 3

The procedure described in Example 1 is repeated, except that 20 parts of the 40% solution, according to Instructions A, of the homopolymer of ethyl acrylate as component (a) in 2-ethyl-n-hexanol as component (b) are initially introduced and subsequently 3 parts of the component (c) indicated in Example 1, 5 parts of 2-ethyl-n-hexanol as component (b), 3 parts of the component (d) indicated in Example 1, 2 parts of an adduct of 9 mols of ethylene oxide with 1 mol of p-nonylphenol as component (e) and 67 parts of deionised water as component (h) are introduced one after the other, likewise affording a readily pourable, storage-stable, finely disperse, aqueous emulsion.

EXAMPLE 4

The procedure described in Example 1 is repeated, except that 40 parts of the 50% solution, according to Instructions L, of the homopolymer of n-butyl acrylate as component (a) in 2-ethyl-n-hexanol as component (b) are initially introduced and subsequently 20 parts of component (c) indicated in Example 1, 10 parts of cyclohexanol as component (b), 10 parts of the component (d) indicated in Example 1, 5 parts of an adduct of 9 mols of ethylene oxide with 1 mol of p-nonylphenol as component (e) and 15 parts of deionised water as component (h) are introduced one after the other, likewise affording a readily pourable, storage-stable, finely disperse, aqueous emulsion.

EXAMPLE 5

The procedure described in Example 1 is repeated, except that 25 parts of the 50% solution, according to Instructions G, of the homopolymer of n-butyl acrylate as component (a) in 2-ethyl-n-hexanol as component (b) are initially introduced and subsequently 7 parts of the component (c) indicated in Example 1, 5 parts of cyclohexanol as component (b), 8 parts of the ammonium salt of the acid sulfate of the adduct of 2 mols of ethylene oxide with 1 mol of p-tert.-nonylphenol as component (d), 10 parts of paraffin oil as component (g), 2 parts of the component (f) indicated in Example 1 and finally 43 parts of deionised water as component (h) are introduced one after the other, likewise affording a readily pourable, storage-stable, finely disperse, aqueous emulsion.

EXAMPLE 6

The procedure described in Example 1 is repeated, except that 30 parts of the 50% solution, according to Instructions D, of the homopolymer of n-butyl acrylate as component (a) in trimethylbenzene as component (b) are initially introduced and subsequently 5 parts of the component (c) indicated in Example 1, 5 parts of trimethylbenzene, (technical isomer mixture) as component (b), 2 parts of the sodium salt of the acid sulfate of the adduct of 3 mols of ethylene oxide with a technical mixture of unsaturated $C_9$–$C_{13}$-fatty alcohols as component (d), 5 parts of the adduct of 4 mols of ethylene oxide with a technical mixture of unsaturated $C_9$–$C_{13}$-fatty alcohols as component (e) and finally 53 parts of deionised water as component (h) are introduced one after the other, likewise affording a readily pourable, storage-stable, finaly disperse, aqueous emulsion.

In place of 30 parts of the 50% solution, according to Instructions D, of the homopolymer of n-butyl acrylates (sic) as component (a) in trimethylbenzene as component (b), it is also possible to employ 30 parts of the 50% solution, according to Instructions M, of the homopolymer of n-butyl acrylate as component (a) in the mixture of aliphatic, straight-chain hydrocarbons as component (b), or 30 parts of the 50% solution, according to Instructions N, of the homopolymer of n-butyl acrylate as component (a) in the mixture of aliphatic hydrocarbons, having branched chains, as components (b).

EXAMPLE 7

The procedure described in Example 1 is repeated, except that 30 parts of the 50% solution, according to Instructions E, of the homopolymer of n-butyl acrylate as component (a) in trimethylhexanol as component (b) are initially introduced and subsequently 3 parts of a polydimethylsiloxane, which has a kinematic viscosity of 400 mm$^2$/second at 25° C. and has been treated with silica having a surface area of 300 m$^2$/g at 150° C., as component (c), 6 parts of trimethylhexanol (a technical mixture of primary iso-nonanols with 3,5,5-trimethylhexanol as the main constituent) as component (b), 10 parts of the ammonium salt of the acid phosphate of the adduct of 8 mols of ethylene oxide with 1 mol of tallow fatty amine as component (d) and finally 51 parts of deionised water as component (h) are introduced one after the other, likewise affording a readily pourable, storage-stable, finely disperse, aqueous emulsion.

EXAMPLE 8

The procedure described in Example 1 is repeated, except that 20 parts of the 50% solution, according to Instructions F, of the homopolymer of n-butyl acrylate as component (a) in the reaction product of glycerol and propylene oxide as component (b) are initially introduced and subsequently 5 parts of the component (c) indicated in Example 1, 10 parts of a reaction product of glycerol and propylene oxide, having a molecular weight of 4,000, as component (b), 5 parts of the ammonium salt of the acid sulfate of the adduct of 3 mols of ethylene oxide with 1 mol of tridecyl alcohol as component (d), 2 parts of paraffin oil as component (g), 2 parts of the component (f) indicated in Example 1 and finally 56 parts of deionised water as component (h) are introduced one after the other, likewise affording a readily pourable, storage-stable, finely disperse, aqueous emulsion.

EXAMPLE 9

The procedure described in Example 1 is repeated, except that 37 parts of the 50% solution, according to Instructions B, of the homopolymer of n-butyl acrylate as component (a) in 2-ethyl-n-hexanol as component (b) are initially introduced and subsequently 41 parts of the component (g) indicated in Example 1, 8 parts of cyanoethylated trimethylhexanol as component (b), 7 parts of the component (f) indicated in Example 1, 3.5 parts of coconut fatty acid diethanolamide as component (d) and finally 3.5 parts of oleic acid as component (h) are introduced one after the other, affording the composition as a storage-stable, homogeneous solution.

In place of cyanoethylated methylhexanol, it is also possible to employ the maleate of trimethylhexanol as component (b).

EXAMPLE 10

The procedure described in Example 1 is repeated, except that 34 parts of the 50% solution, according to Instructions B, of the homopolymer of n-butyl acrylate as component (a) in 2-ethyl-n-hexanol as component (b) are initially introduced and subsequently 36 parts of the component (g) indicated in Example 1, 17 parts of distearyl maleate as component (b), 6 parts of the component (f) indicated in Example 1, 3.5 parts of coconut fatty acid diethanolamide as component (e) and finally 35 parts of oleic acid as component (h) are introduced one after the other, likewise affording the composition as a storage-stable, homogeneous solution.

EXAMPLE 11

In a beam-dyeing apparatus, 100 kg of a polyethylene glycol terephthalate fabric are pre-wetted in 1,000 liters of water. The liquor is then heated to 70° C., whereupon the following additives are added: 3,000 g of a mixture of 70.0% of trimethylbenzene, 11.1% of paraffin oil, 13.4% of the ammonium salt of the acid sulfate of the adduct of 1 mol of p-nonylphenol with 2 mols of ethylene oxide, 5.5% of the adduct of 1 mol of p-nonylphenol with 9 mols of ethylene oxide, 300 g of the aqueous emulsion according to Example 1 and 4,000 g of the dye of the formula

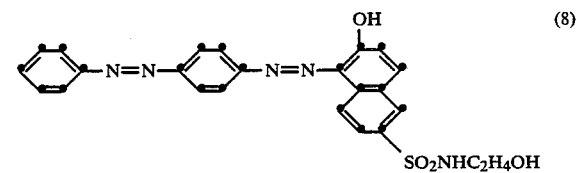

(8)

The dye liquor is then adjusted to pH 5.5 with 85% formic acid and is heated to 120° C. in the course of 30 minutes, whereupon the fabric is dyed for 30 minutes at this temperature. Subsequently, the liquor is cooled, and the dyed fabric is rinsed and dried. A deep red dyeing, which is fast to rubbing, of the fabric thus dyed is obtained. Due to the addition of the emulsion according to Example 1, the dyeing system as well as the overflow tank always remain foam-free. The formation of light spots due to air inclusions in the material is avoided. Similar results are obtained when 300 g of one of the aqueous emulsions according to one of Examples 2 to 8 are employed in each case in place of 300 g of the emulsion according to Example 1. If dyeing is carried out in the same manner, but without an emulsion according to one of Examples 1 to 8, marked foam formation is observable.

EXAMPLE 12

In a muff-dyeing apparatus, 100 kg of a polyethylene glycol terephthalate yarn in 1,200 liters of water are heated to 60° C. The following additives are then added to the liquor: 2,400 g of ammonium sulfate, 2,000 g of a 70% aqueous solution of the ammonium salt of the acid sulfate of a condensation product of glycerol and propylene oxide, having a molecular weight of 4,200, 450 g of the emulsion according to Example 1 and 3,700 g of a dye of the formula

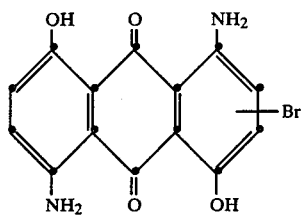

(9)

an aqueous liquor which contains 54 g of a dye of the formula

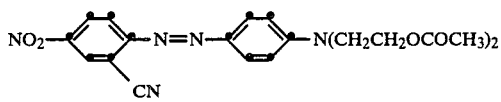

(10)

27 g of a dye of the formula

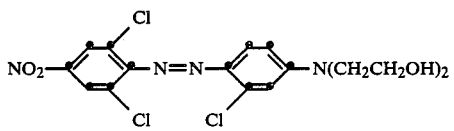

(11)

130 g of a dye of the formula

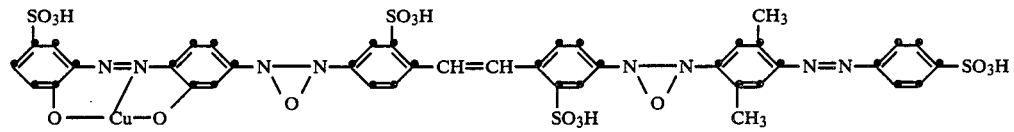

(12)

10 g of a dye of the formula

SO3H ... (13)

The dyebath is adjusted to pH 5 with 85% formic acid and is heated to 130° C. in the course of 45 minutes, whereupon the yarn is dyed at this temperature for 60 minutes. Subsequently, the bath is cooled, and the dyed yarn is rinsed and dried. The deep, level blue dyeing, fast to rubbing, of the yarn thus dyed is obtained. The dyebath, the overflow tank and the muffs are completely deaerated as a result of the addition of the emulsion according to Example 1. Similar results are obtained when 450 g of one of the emulsions according to one of Examples 2 to 8 are employed in each case in place of 450 g of the emulsion according to Example 1. If dyeing is carried out without an emulsion according to one of Examples 1 to 8, air inclusions within the muffs can lead to light, less intensely dyed yarn crossover points.

EXAMPLE 13

100 kg of a fabric of 50% of cotton and 50% of polyethylene glycol terephthalate are treated at 40° C. for 20 minutes in a high-temperature winch with 3,000 parts of 3,000 g of a mixture of 16.5% of phenyl benzoate, 38.5% of 2-methylphenyl benzoate, 8% of ethylene glycol, 17% of isopropanol, 2% of ethanolamine, 1.5% of pine oil and 16.5% of the acid phosphate of the adduct of 1 mol of p-nonylphenol with 10 mols of ethylene oxide, 6,000 g of ammonium sulfate and 700 g of the emulsion according to Example 1 and has a pH value of 5.6. 10 kg of sodium sulfate are then added to the liquor, and the liquor is heated to 115° C. in the course of 40 minutes. The fabric is dyed for 30 minutes at this temperature, and the bath is then cooled. The dyed fabric is rinsed and dried. As a result of the addition of the emulsion according to Example 1, foam-free dyeing is possible. The fabric does not tend to float in the winch, which makes very level dyeing possible. Similar results are obtained when 700 g of one of the emulsions according to one of Examples 2 to 8 are employed in each case in place of 700 g of the emulsion according to Example 1.

EXAMPLE 14

100 kg of cotton tricot are wetted in 600 liters of deionised water at 40° C. on a short-liquor jet. 36 kg of sodium chloride, 5 kg of the dye of the formula

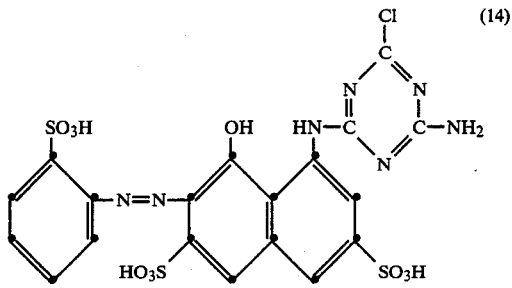

and 0.3 kg of the emulsion according to Example 1 are then added to the liquor.

The fabric is dyed for 45 minutes at 40° C. on the short-liquor jet. 0.6 kg of calcined sodium carbonate and, after a further 5 minutes, 1.2 kg of an aqueous 36% sodium hydroxide solution are then added. The tricot is then dyed for a further 40 minutes, subsequently rinsed and washed again. A fast, level red dyeing of the tricot results. There is no disturbance in the movement of the goods during the dyeing process. Similar results are obtained when 0.3 kg of one of the emulsions according to one of Examples 2 to 8 are employed in each case in place of 0.3 kg of the emulsions according to Example 1. If dyeing is carried out in the same liquor, but without an emulsion according to one of Examples 1 to 8, disturbances in the movement of the goods occur, due to foam formation.

EXAMPLE 15

A cheese of 70 g of cotton is wetted in 500 ml of water at 30° C. in a circulation apparatus. Subsequently, the following additives are added to the liquor: 10 ml of an aqueous 30% sodium hydroxide solution, 3 g of an 86% sodium hydrosulfite solution, 0.3 g of the emulsion according to Example 1 and 0.5 g of a vat dye, consisting of a mixture of Vat Blue 4 C.I. 69,800 and Vat Blue 6 C.I. 69,825 (1:3), which mixture has been pre-dispersed with water and 5 ml of a 30% aqueous sodium hydroxide solution.

After the additives have been uniformly distributed, the dyeing liquor is warmed to 60° C. in the course of 30 minutes and the cotton is dyed for 30 minutes at this temperature. 6 g of sodium chloride are then added to the dyeing liquor, whereupon the cotton is dyed for a further 30 minutes at 60° C. Subsequently, the dyed material is rinsed warm and cold and is dried. This gives a uniform and fast blue dyeing of the cotton dyed in this way. Similar results are obtained when 0.3 g of one of the emulsions according to one of Examples 2 to 8 is employed in each case in place of 0.3 g of the emulsion according to Example 1. Due to the deaerating and defoaming action of the emulsions according to one of Examples 1 to 8, no air inclusions form in the package. The yarn is also dyed through without faults at the crossover points.

EXAMPLE 16

100 kg of raw cotton tricot are wetted in 2,500 liters of water on a closed winch, with the addition of: 7,500 g of a preparation consisting of 43% of hydrolysed polymaleic anhydride (50% of free acid), 14% of an aqueous 25% ammonia solution and 43% of a 30% aqueous solution of a condensation product of polyethylene glycol, maleic anhydride, propoxylated pentaerythritol and stearic acid. After this, 40 liters of a 30% aqueous sodium hydroxide solution and 10 kg of an 86% sodium bisulfate solution are added to the liquor. 2,000 g of the emulsion according to Example 1 are then added. A stock vat consisting of 75 l of water, 2,500 g of an 85% aqueous sodium bisulfite solution, 6 l of an aqueous 30% sodium hydroxide solution, 1,000 g of the vat dye Vat Yellow 3 C.I. 67,300 and 500 g of the vat dye Vat Violet 9 C.I. 60,005 are then added.

Subsequently, the dyeing liquor is warmed to 70° C. in the course of 30 minutes and the cotton is dyed for 30 minutes at this temperature. The dyed material is then rinsed, and is oxidised in running cold water. After drying, a level dyeing is obtained. The tricot has a pleasant soft handle and is free from creases. Due to the addition of the emulsion according to Example 1, the system is free from foam and the tricot does not tend to float. Similar results are obtained when 2,000 g of the emulsion according to one of Examples 2 to 8 are employed in each case in place of 2,000 g of the emulsion according to Example 1.

EXAMPLE 17

In a hank dyeing apparatus, 100 kg of plaid wool yarn are dyed in 3,000 liters of water as follows:

The dyeing liquor is warmed to 40° C. and 2,000 g of ammonium sulfate, 2,000 g of 80% aqueous acetic acid, 1,500 g of a mixture of 1 part of an adduct which has been obtained from 1 mol of fatty acid (a technical acid mixture having 18 to 22 carbon atoms) and 30 mols of ethylene oxide and has been quaternised with dimethyl sulfate, and 3 parts of an adduct which has been obtained from 1 mol of tallow fatty acid amide and 16 mols of ethylene oxide and has been crosslinked with sulfamic acid, and 1,000 g of the emulsion according to Example 1 are then added.

The stock carrier is then introduced into the dyeing apparatus. The liquor flow is reversed every 30 minutes. The dissolved dye is then added, namely 2,000 g of the mixed 1:2 chromium complex with one of each of the dyes of the formulae

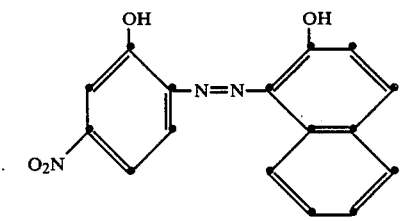

and

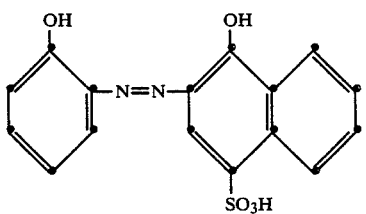

and 2,000 g of the dye of the formula

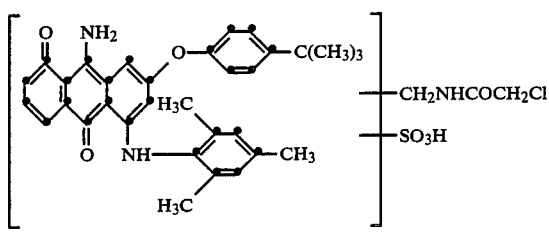

(17)

The liquor is then warmed to 100° C. in the course of 40 minutes, and this temperature is maintained for 30 minutes. The liquor is then cooled, and the fabric is rinsed, drained and dried. This gives a level dyeing. Due to the deaerating and defoaming action of the emulsion according to Example 1, the material is already completely deaerated when being introduced into the dyeing apparatus. This has the effect that more lightly dyed yarns are not obtained even at the points where the hank yarn rests on the stock carrier. Similar results are obtained when 1,000 g of the emulsions according to one of Examples 2 to 8 are employed in each case in place of 1,000 g of the emulsion according to Example 1.

EXAMPLE 18

In a cheese dyeing apparatus, 100 kg of wool yarn in 1,200 liters of water are warmed to 60° C. With continuous liquor circulation, the following additives are then added: 6,000 g of 96% sulfuric acid, 500 g of an aqueous solution of 3% of an adduct obtained from 1 mol of 2-ethyl-n-hexanol and 5 mols of ethylene oxide and 24% of an adduct which has been obtained from 1 mol of tallow fatty amine and 30 mols of ethylene oxide and has been quaternised with dimethyl sulfate, 1,000 g of a 50% aqueous preparation of dimethylolethyleneurea, 2,000 g of the 1:1 chromium complex dye Acid Red 183 C.I. 18,000, 300 g of the 1:1 chromium complex of the dye of the formula

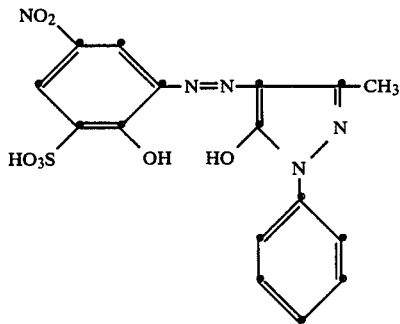

(18)

and 800 g of the emulsion according to Example 1.

The dyeing liquor is warmed to 85° C. in the course of 30 minutes and the wool is dyed for 90 minutes at this temperature. Subsequently, the dyebath is cooled, and the wool is rinsed and dried. This gives a level red dyeing of the treated wool. Due to the deaerating action of the emulsion according to Example 1, the cheeses are free from light points, such as are caused by air inclusions. Similar results are obtained when 800 g of the emulsions according to one of Examples 2 to 8 are employed in each case in place of 800 g of the emulsion according to Example 1.

EXAMPLE 19

A vigorously foaming industrial effluent having a surface tension of 32.7 dynes/cm is sprayed with the emulsion according to Example 1, diluted with water in the ratio of 100:1, in the activated sludge tank of an effluent treatment plant. The quantity employed is metered in such a way that 5 ppm are used for the total quantity of effluent. In this way, it is possible to keep the height of the foam on the effluent constant at about 10 to 20 cm. Without the use of the emulsion according to Example 1, such a quantity of foam forms that the activated sludge tanks overflow after about 30 to 60 minutes. Similar results are obtained if 5 ppm of the emulsions, diluted in the ratio 100:1, according to one of Examples 9 or 10 are employed in each case in place of the emulsion according to Example 1. It should also be noted that the vigorous formation of foam is strongly promoted by the air introduced by means of a large pedal stirrer. This introduction of air is necessary, however, in order to enable the ballast substances to be diodegraded.

EXAMPLE 20

15 ppm of sodium dodecylbenzenesulfonate are added to 1,000 ml of water (water temperature 20° to 25° C.) in a beaker, and the mixture is then caused to foam with the aid of a mixer and by blowing in air (32 l of air/hour). After 5 minutes, a foam height of 10 cm is reached. 3 ppm of the emulsion according to Example 1, diluted before addition with water in the ratio of 100:1, are then added. After 2 seconds, the foam has been completely eliminated. If mixing and air-blowing is continued, renewed foam formation is not observed even after 30 minutes. If the test is carried out in the same way, but without the addition of the emulsion according to Example 1, the foam rises to a height of more than 15 cm.

Similar results are obtained when 3 ppm of the emulsions, diluted in a ratio of 100:1, according to one of Examples 9 or 10 are employed in each case in place of the emulsion according to Example 1.

EXAMPLE 21

In textile printing, it is inevitable that air in the form of micro-foam is included during the stirring of the printing paste. This adversely affects the print quality and, in particular, also the reproducibility. The inclusion of air can be completely avoided if the printing paste is prepared in the manner described below.

1,000 g of a printing paste are prepared in a stirred vessel, with continuous stirring, by mixing the following components with one another:

406 g of boiling water are initially introduced. The following are then added:
20 g of the dye of the formula

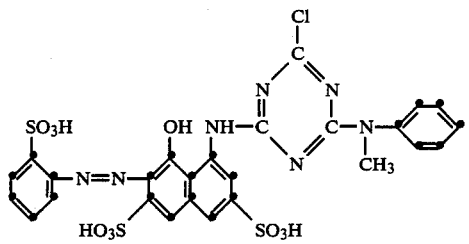

(19)

The further components are added only after the dye has dissolved.

100 g of urea
10 g of sodium m-nitrobenzenesulfonate
4 g of the emulsion according to Example 1
400 g of a preparation containing 7% of sodium alginate, 0.5% of sodium tetrametaphosphate and sodium hexametaphosphate and 92.5% of water, and
60 g of sodium carbonate.

The printing paste has no air inclusions. This can be checked, for example, as follows:
1. By a microscopic check.
2. By comparing the volume immediately after stirring and after leaving the printing paste to stand for 24 hours in a closed vessel.
3. By the weighing method described below.

WEIGHING METHOD

In each case, exactly 25 cm³ of the printing pastes, obtained directly after stirring and after storage for 24 hours, are introduced into a weighed small weighing dish, dried to constant weight and reweighed. The quantity of previously included air can be calculated from the difference in weight.

% air inclusion $$V_I = \frac{(A_{II} - A_I) \cdot 100}{A_{II}}$$

$A_{II}$ = final weight of the sample stored for 24 hours
$A_I$ = final weight of the sample immediately after stirring
$V_I$ = air inclusion in %.

In the present example, the volume of the sample obtained immediately after stirring corresponds exactly to the volume of the sample stored for 24 hours. The weighing method also gave the same weight.

If the tests are carried out without an addition of the emulsion according to Example 1, the volume of the sample obtained immediately after stirring is 25% greater than that of the stored sample, and the weighing test also gives an air inclusion of 25%.

The printing paste according to the present example is used in the conventional manner for the printing of cotton fabric. The colour yield is about 25% higher than that of an identical printing paste which, however, does not contain any emulsion according to Example 1; moreover, the print is more solid and more level.

Similar results are obtained with a printing paste in which, in place of 400 g of the aqueous preparation of sodium alginate, 400 g of a semi-emulsion are employed which contains 5% of a reaction product obtained from oleyl alcohol and 80 mols of ethylene oxide (12.5%, aqueous), 15% of water, 40% of white spirit and 40% of sodium alginate (5% aqueous). This also applies when 4 g of the emulsion according to Example 1 are replaced by 4 g of one of the emulsions according to one of Examples 2 to 8 in each case.

EXAMPLE 22

1,000 g of a printing paste for the printing of a polyester fabric by the thermofixing process are prepared as follows: with continuous stirring, 920 g of a preparation which contains 50% of sodium alginate (5%, aqueous), 47% of water, 0.5% of a 50% aqueous tartaric acid solution, 0.5% of the emulsion according to Example 1 and 2% of the reaction product obtained from octadecyl alcohol and 35 mols of ethylene oxide (25%, aqueous), and 80 g of the dye of the formula

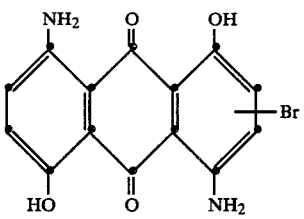

(20)

are brought together.

This printing paste also shows no air inclusions. Without addition of the emulsion according to Example 1, 15% of air are included. Correspondingly, the colour yield is 15% lower when printing a textile material. Moreover, the print is not level. Similar results are obtained when 0.5% of one of the emulsions according to one of Examples 2 to 8 is employed in each case in place of 0.5% of the emulsion according to Example 1.

EXAMPLE 23

One liter of black liquor (effluent from the alkaline pulping of wood in a cellulose manufacture) is heated to 80° C. in a beaker of 1.5 liters capacity, and foam is generated by means of a vibratory mixer.

The air is metered in through the vibratory mixer. At a foam height of 13 cm, 250 ppm of an emulsion according to one of Examples 1, 9 or 10 are metered in each time. The foam is completely eliminated (permanent effect). If conventional silicone anti-foam emulsions are used, an instantaneous anti-foam effect can admittedly be achieved, but there is no permanent effect. The special action of the emulsions according to one of Examples 1, 9 or 10 is to be ascribed to the fact that these are highly resistant to alkali. The pH value of the black liquor is about 13.5.

EXAMPLE 24

In an industrial waste-air purification plant, foam is increasingly generated by the dyes and surfactants removed from the air. By an addition of 400 ppm of the emulsions according to one of Examples 1, 9 or 10, it was possible completely to avoid foaming.

What is claimed is:
1. A surfactant-containing composition, consisting essentially of
   (a) 8 to 30 percent by weight of a homopolymer of an aliphatic $C_1$–$C_8$-alkyl acrylate or methacrylate or a copolymer of this alkyl ester with styrene or acrylic or methacrylic acid,
   (b) 10 to 40 percent by weight of a hydronaphthalene, an alkylbenzene, an acyclic or cyclic alkanol having 4 to 12 carbon atoms, an alkylene oxide adduct of a polyhydric alcohol having 2 to 6 carbon atoms or a maleate of aliphatic $C_4$–$C_{22}$-alcohols, (c) 0 to 20 percent by weight of a hydrophobic silicone oil, (d) 0 to 10 percent by weight of an anionic surfactant, (e) 0 to 10 percent by weight of a non-ionic surfactant selected from adducts of an alkylene oxide and an aliphatic monoalcohol of 8 to 22 carbon atoms, an unsubstituted or alkyl- or phenyl-substituted phenol, or a fatty acid, amine or amide each of 8 to 22 carbon atoms; alkylene oxide condensation products; reaction products of a fatty acid and hydroxyalkyl or alkoxy-alkyl-amine or alkylene oxide adducts of these reaction products; and fatty alcohols of 8 to 22 carbon atoms, (f) 0 to 10 percent by weight of a surface-active, hydrophilic siloxanoxyalkylene copolymer, (g) 0 to 50 percent by weight of a mixture of paraffins or paraffins in admixture with naphthenes or aromatics and (h) 0 to 70 percent by weight of additives selected from water, high-molecular-weight acids, aqueous ammonia, and aqueous solutions of an alkali metal hydroxide, at least 2% of one of the components (d) and (e) being employed.

2. A composition according to claim 1, which contains, as the component (a), a copolymer of ethyl, n-butyl or 2-ethylhexyl acrylate or methacrylate and styrene or acrylic or methacrylic acid, or a homopolymer of ethyl, n-butyl or 2-ethylhexyl acrylate.

3. A composition according to claim 1 wherein component (b) is dihydronaphthalene, tetrahydronaphthalene or decahydronaphthalene, a methyl-substituted or ethyl-substituted benzene, a cycloalkanol having 4 to 6 carbon atoms, an alkanol which has 6 to 12 carbon atoms, a cyanoalkanol which has 6 to 12 carbon atoms, an alkylene oxide adduct of glycerol or pentaerythritol or a maleate of alkanols of the indicated type or of fatty alcohols having 8 to 18 carbon atoms.

4. A composition according to claim 1, which contains a component (a) which has been prepared in the presence of component (b) or (g) and of a polymerization catalyst.

5. A composition according to claim 1, which contains component (c), wherein component (c) is a polyalkyl-, polyaryl- or polyaralkyl-siloxane oil or an alicyclic polysiloxane oil.

6. A composition according to claim 5, wherein component (c) has been blocked with terminal hydroxyl groups.

7. A composition according to claim 6, wherein component (c) has been treated with fillers which confer hydrophobic properties thereto.

8. A composition according to claim 1, which contains, as the component (d), a sulfonated benzyl-alkyl-benzimidazole or a salt thereof, an alkylphenyl-sulfonate or salt thereof, or an acid ester or salt thereof of an alkylene oxide adduct of a fatty alcohol or alkylphenol.

9. A composition according to claim 1, which contains as the component (e), a fatty acid dialkanolamide, a fatty alcohol or an alkylene oxide adduct of a fatty alcohol, fatty acid or alkylphenol.

10. A composition according to claim 1, which contains component (f), wherein component (f) is an adduct of an organopolysiloxane and ethylene oxde or propylene oxide or both ethylene oxide and propylene oxide.

11. A composition according to claim 1, which contains, component (g), wherein component (g) is a mixture of paraffins having a boiling range from 110° to 260° C.

12. A composition according to claim 1, which contains, component (g), which component (g) is a mixture of 45 to 70 percent by weight of paraffins, 25 to 45 percent by weight of naphthenes and 5 to 20 percent by weight of aromatics.

13. A composition according to claim 1, wherein component (h) is deionized water containing an alkali or a high-molecular-weight acid.

14. A composition according to claim 1, which contains 10 to 30 percent by weight of component (a), 10 to 40 percent by weight of component (b), 2 to 10 percent by weight of component (e), 2 to 10 percent by weight of component (f), 20 to 50 percent by weight of component (g) and 0 to 10 percent by weight of component (h).

15. A composition according to claim 1, which contains 10 to 30 percent by weight of component (a), 10 to 40 percent by weight of component (b), 2 to 20 percent by weight of component (c), 2 to 20 percent by weight of component (d), 0 to 10 percent by weight of component (e), 0 to 5 percent by weight of component (f), 0 to 10 percent by weight of component (g) and 10 to 70 percent by weight of component (h).

16. A composition according to claim 1, which contains 15 to 20 percent by weight of component (a), 15 to 30 percent by weight of component (b), 5 to 15 percent by weight of component (c), 5 to 10 percent by weight of component (d), 2 to 5 percent by weight of component (e) and 10 to 70 percent by weight of component (h).

17. A composition according to claim 1, which contains 15 to 20 percent by weight of component (a), 15 to 30 percent by weight of component (b), 5 to 15 percent by weight of component (c), 5 to 10 percent by weight of component (d), 1 to 3 percent by weight of component (f), 2 to 10 percent by weight of component (g) and 10 to 50 percent by weight of component (h).

18. A process for the preparation of a composition, according to claim 1, which comprises initially introducing the components (a) and (b) and first mixing in, component (c), followed, by components (g) and then (f), followed by at least one of components (d) and (e) at 10° to 30° C. and, finally adding component (h).

19. A process for defoaming and deaerating aqueous systems, which comprises employing a composition according to claim 1.

20. A process for defoaming and deaerating industrial effluents, which comprises employing $1 \times 10^{-7}$ to $1 \times 10^{-3}$ g of a composition according to claim 1 per liter of effluent.

21. A process for defoaming and deaerating industrial effluents, which comprises adding $1 \times 10^{-7}$ to $1 \times 10^{-6}$ g of a composition according to claim 1 per liter of effluent to the industrial effluent in an activated sludge tank of an effluent treatment plant.

22. A process for defoaming and deaerating industrial effluents, which comprises adding $1 \times 10^{-4}$ to $1 \times 10^{-2}$ g of a composition according to claim 1 per liter of effluent to the effluent from the alkaline pulping of wood in cellulose manufacture.

23. A process for defoaming and deaerating industrial effluents, which comprises adding $1 \times 10^{-4}$ to $1 \times 10^{-2}$ g of a composition according to claim 1 per liter of wash water to the wash water for operating an industrial waste-air purification plant.

* * * * *